Nov. 29, 1949 — G. B. WAGNER — 2,489,510
REFRIGERATED SHIPPING CONTAINER
Filed July 12, 1945 — 7 Sheets-Sheet 2

Inventor:
George B. Wagner,
by Kenway & Witter
Attorneys

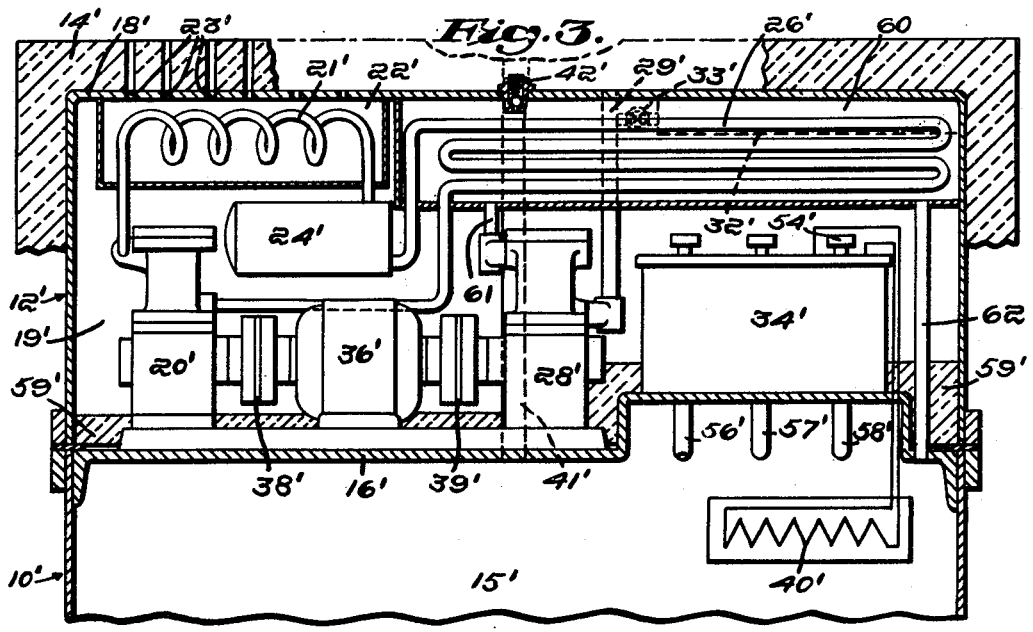
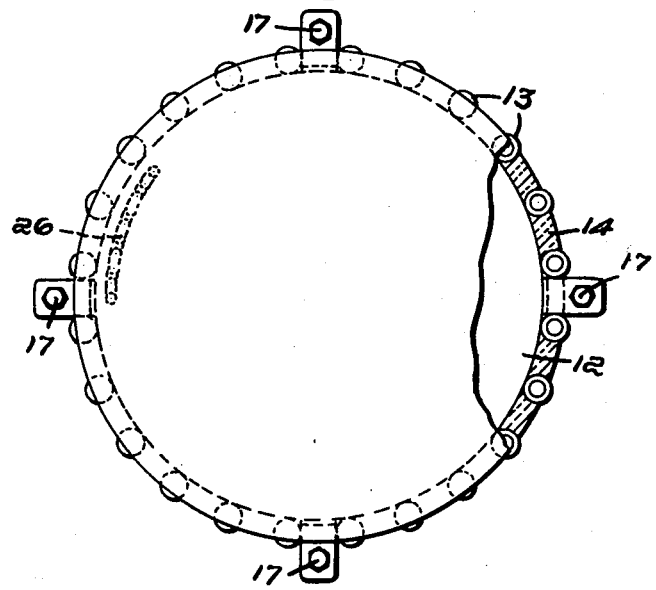

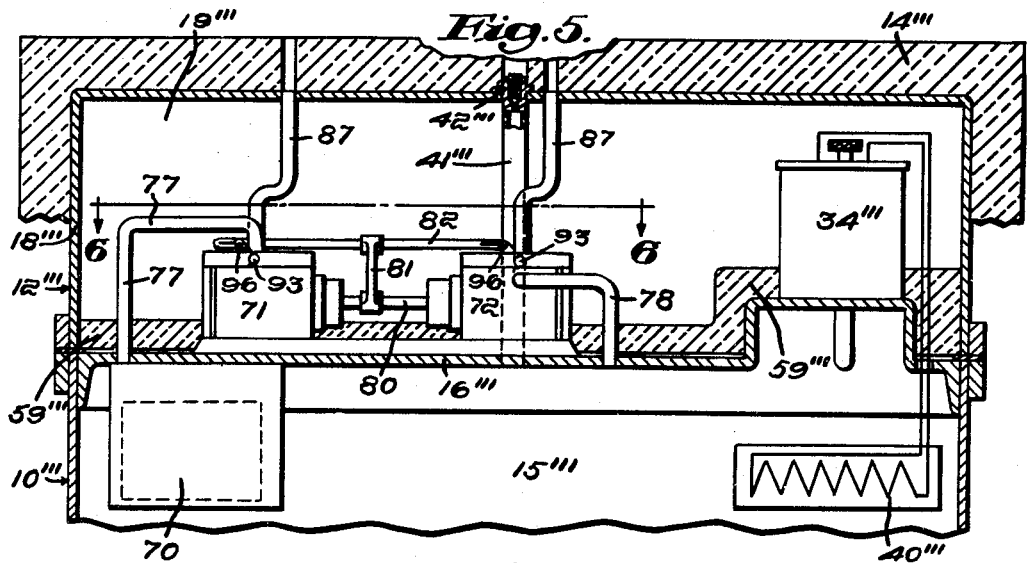
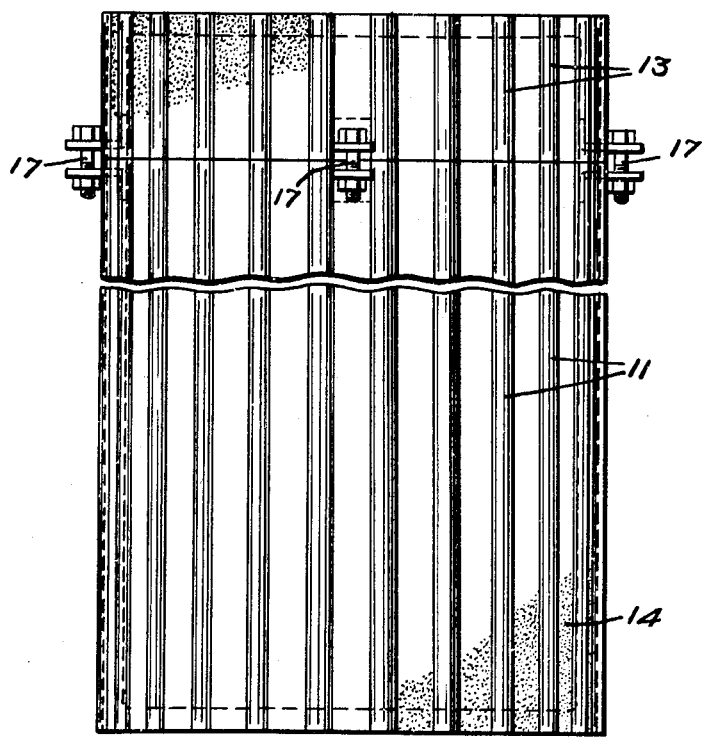

Nov. 29, 1949 — G. B. WAGNER — 2,489,510
REFRIGERATED SHIPPING CONTAINER
Filed July 12, 1945 — 7 Sheets-Sheet 6
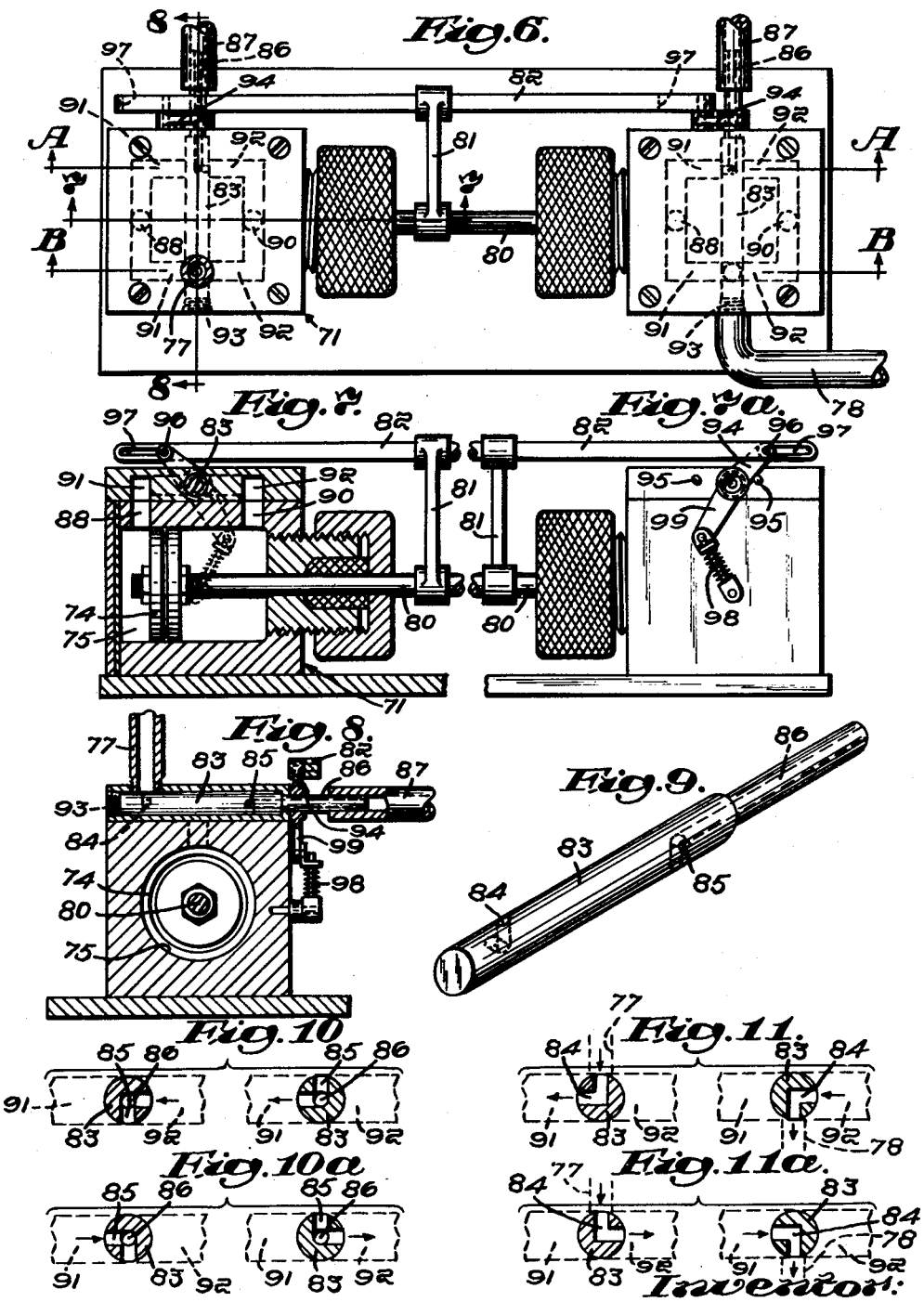

Nov. 29, 1949 G. B. WAGNER 2,489,510
REFRIGERATED SHIPPING CONTAINER
Filed July 12, 1945 7 Sheets-Sheet 7
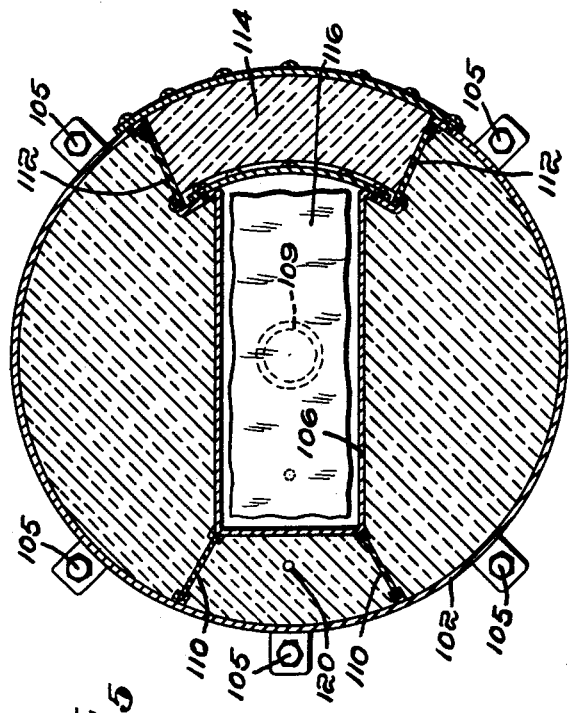
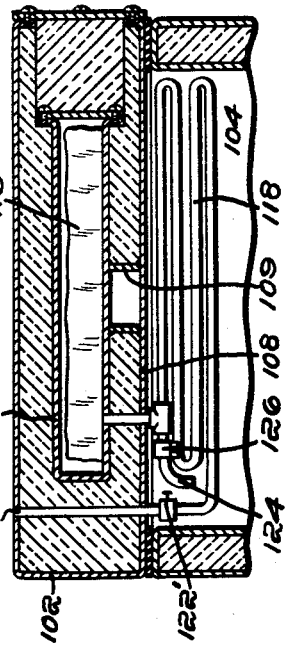
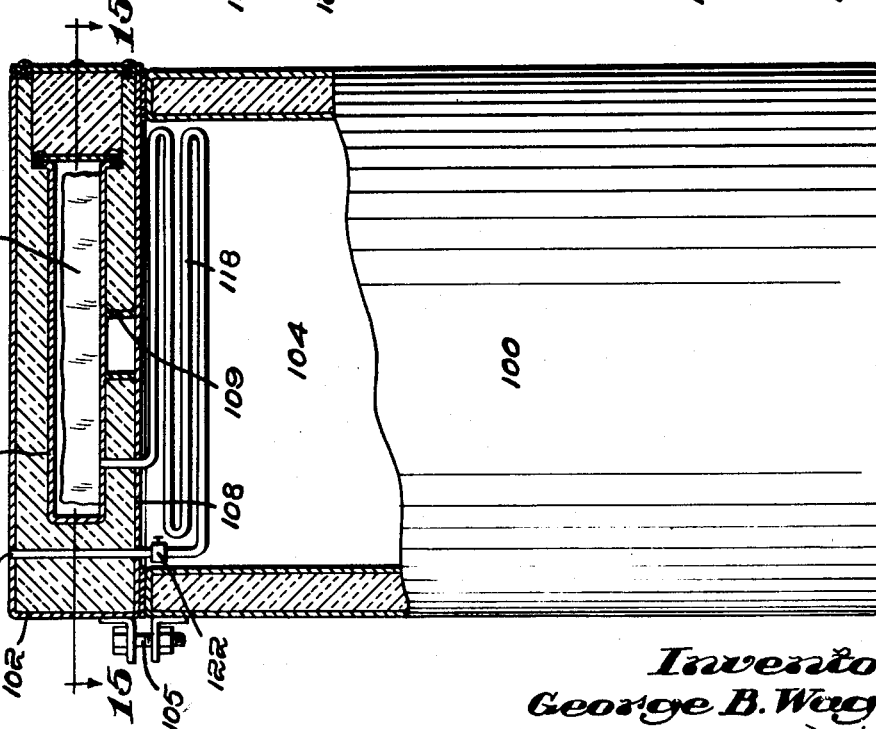
Inventor:
George B. Wagner Patented Nov. 29, 1949

2,489,510

UNITED STATES PATENT OFFICE 2,489,510

REFRIGERATED SHIPPING CONTAINER

George B. Wagner, Holbrook, Mass., assignor to Beekman Industries, Inc., New York, N. Y., a corporation of New York Application July 12, 1945, Serial No. 604,700

7 Claims. (Cl. 62—91.5)

This invention relates to a novel container and apparatus for preserving perishable products especially when shipped via air. I have determined that perishable animal and vegetable products such for example as whole blood, blood plasma, fresh fish fillets, oysters, live lobsters, orchids, etc., can be preserved in their original condition in a non-liquid atmosphere for substantial periods of time if kept under predetermined atmospheric conditions including temperature, pressure, humidity and change of air. The primary object of the invention resides in the production of the novel shipping containers herein disclosed and adapted to the storage and preserving of such products particularly during transportation.

The shipping container of my invention comprises a compact and self-contained portable unit having a sealed storage chamber of substantial capacity and embodying means for automatically maintaining a predetermined preserving atmosphere within the storage chamber. Such means comprises mechanical or Dry Ice refrigeration and may include an air compressor unit for providing pressure and change of air in the chamber together with automatic controls and means for maintaining necessary and desired humidity.

A further feature of the invention relates to a novel unit for utilizing the waste gas from the Dry Ice refrigerant for operating a compressor to maintain desired air pressure and change of air in the storage chamber, the Dry Ice thereby serving the multiple functions of providing refrigeration, air pressure and change of air in the storage chamber.

A further and important feature of the invention relates to a novel shipping container having a storage chamber within insulated walls and embodying means, preferably located in the cover of the container and preferably embodying Dry Ice refrigerant, for automatically maintaining a predetermined and constant temperature in the storage chamber, whereby whole blood, blood plasma and other perishable products can be conveniently and economically shipped long distances by air without deterioration and without requiring repacking or disturbing the product during transportation. The production of a novel shipping container of this nature comprises a further object of this invention.

These and other features of the invention will be best understood and appreciated from the following description of preferred embodiments thereof selected for purposes of illustration and shown in the accompanying drawing in which—

Fig. 3 is a fragmentary vertical sectional view through the cover portion of a modified construction.

Figure 4:
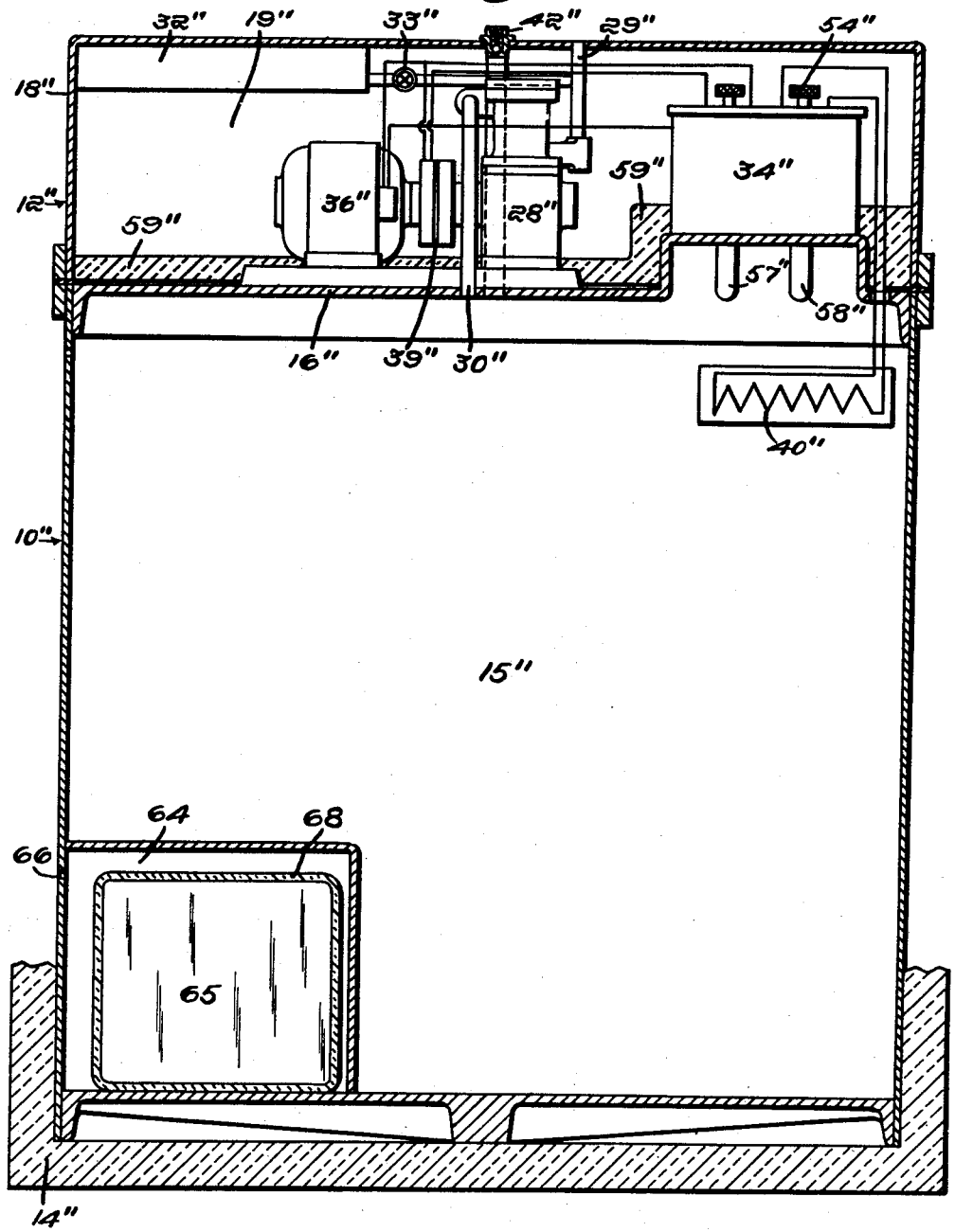

Fig. 4 is a vertical sectional view through a further modified form of the invention, Fig. 5 is a fragmentary vertical sectional view through the cover portion of a further modified construction, Fig. 6 is an enlarged plan view taken on line 6—6 of Fig. 5, Fig. 7 is a vertical sectional view taken on line 7—7 of Fig. 6, Fig. 7ª is an elevation of the rear sides of Fig 7, Fig. 8 is a sectional view taken on line 8—8 of Fig. 6, Fig. 9 is a perspective view of a rotary valve employed, Figs. 10 and 11 are sectional views through the valves on lines A—A and B—B of Fig. 6, Figs. 10ª and 11ª are corresponding views showing the valves rotated to their other position, Fig. 12 is a side elevation of the container, Fig. 13 is a top plan view of the container partly broken away, Fig. 14 is a side elevation, partly in section, of a further modified construction, Fig. 15 is a plan section taken on line 15—15 of Fig. 14, and Fig. 16 is a sectional view like Fig. 14 but showing a further modification.

Figure 1:
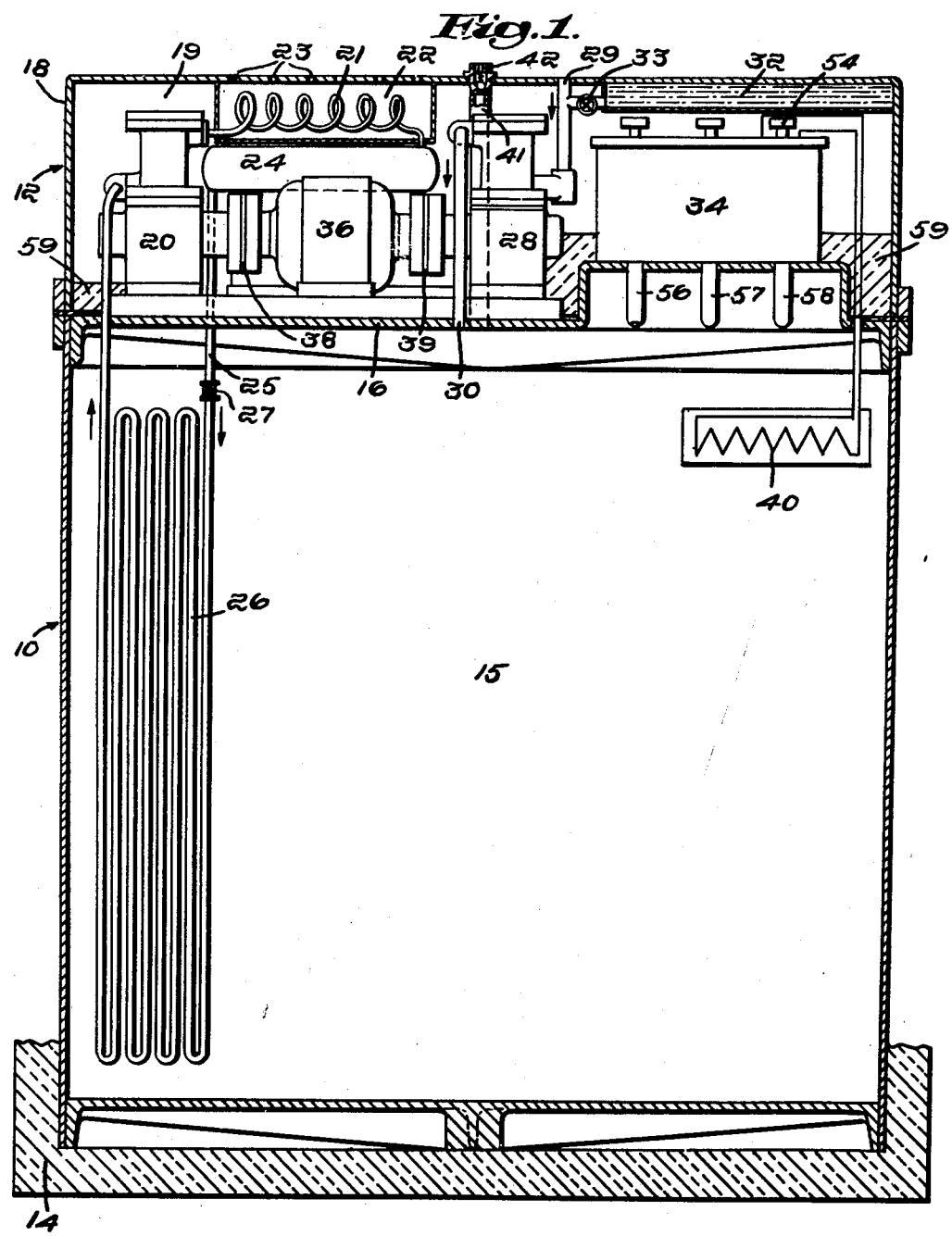
Fig. 1 is a vertical sectional view through a shipping container embodying my invention.
Figure 2:
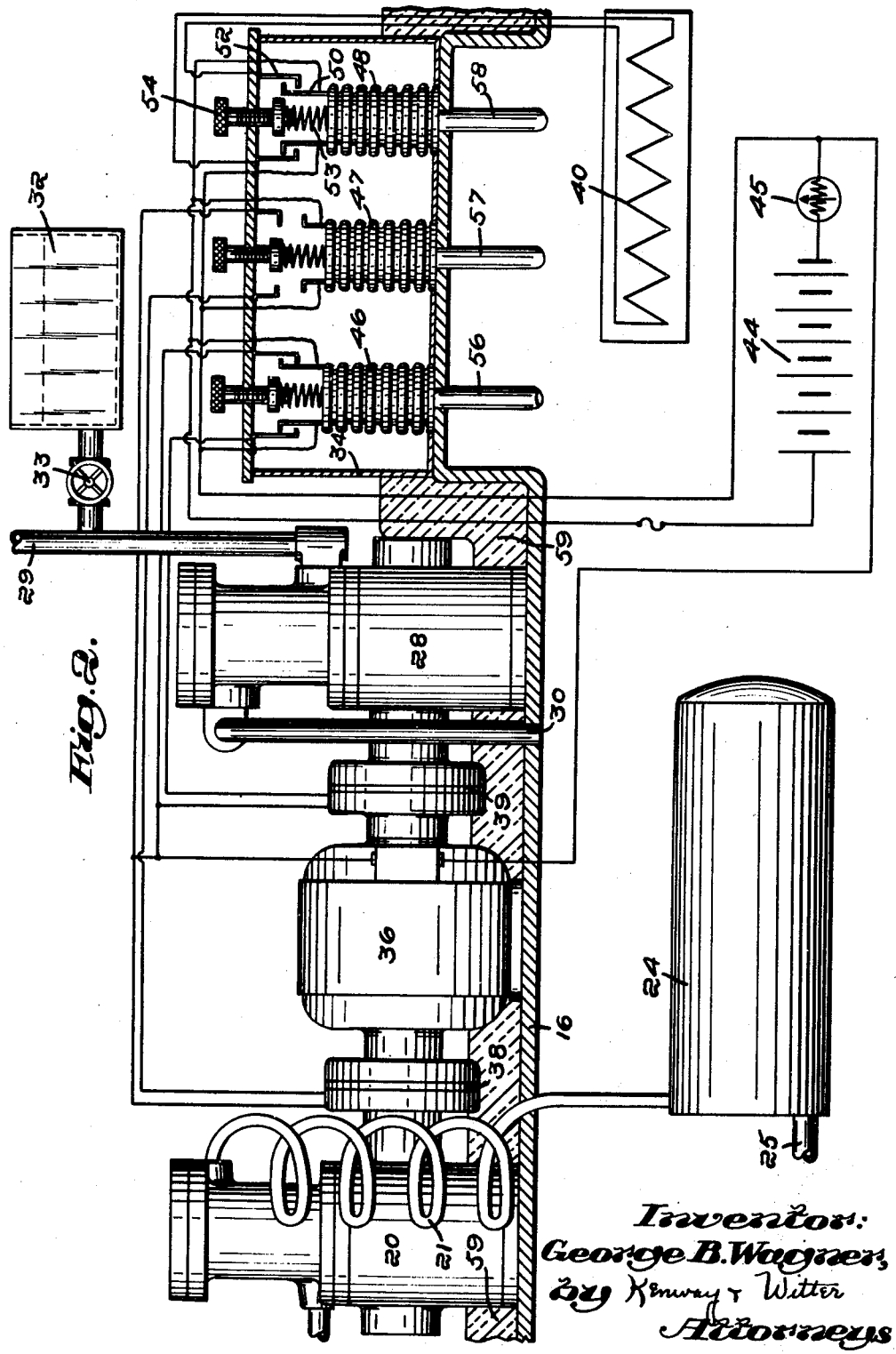
Fig. 2 is an enlarged elevation of the conditioning apparatus thereof.

In Figs. 1 and 2 I have illustrated an embodiment of my invention adapted to the storing and transporting of products requiring uniform predetermined temperature, air pressure, humidity and change of air within the storage chamber. I have found for example that live lobsters can be kept in normal condition and without deterioration or loss for substantial periods of time in an air atmosphere maintained uniformly and constantly at predetermined temperature, air pressure, humidity and change of air. Furthermore, I have shipped lobsters via air in my novel shipping apparatus and maintained them without loss in such atmosphere for a period of 72 hours. The general atmospheric conditions which I have found favorable to lobsters are a temperature of 50 to 60° F. and air pressure approximating and not below normal atmospheric pressure of 14.7 lbs., 60° humidity and an entire change of air each 15 minutes. The apparatus illustrated in Figs. 1 and 2 is adapted to maintain these conditions in the storage chamber.

This apparatus comprises a shipping container including a body portion 10 and a double walled cover 12. The entire container is enclosed within insulation 14 and is preferably of cylindrical construction, as illustrated in Figs. 12 and 13. It may also be desired to protect the container against shock and injury and in Figs. 12 and 13 I have illustrated the container and cover as provided with bumper elements 11 and 13 extending longitudinally of and in spaced relation thereabout. The elements are preferably embedded and anchored in the insulation 14 and project outwardly therefrom to a position protecting the insulation against damage. A relatively large storage chamber 15 is provided within the body 10 and the conditioning mechanism is located outside this chamber, preferably within the cover chamber, whereby the chamber 15 is reserved exclusively for the storage of products to be shipped. The cover can be secured by any convenient clamping means such as the bolts 17 cooperating with clamping ears attached to the body and cover.

The cover 12 embodies an inner wall 16 and a casing 18 providing a chamber 19 therein, the wall 16 fitting closely within the body 10 when the cover is in the working position thereon as shown in Fig. 1. Compactly disposed within the chamber 19 are a compressor 20, a condensing coil 21 within a chamber 22 open to the atmosphere at 23, and a condensing tank 24. A refrigerant evaporating coil 26 is connected to a pipe 25 extending from the tank downwardly through the bottom wall of the cover. A valve 27 controls the flow of refrigerant liquid to the coil which extends back to the compressor in position to be disposed in the chamber 15 when the cover is in the working position of Fig. 1, the coil preferably being located adjacent to the cylindrical wall of the chamber as shown in Fig. 13. Also disposed within the chamber 19 is an air compressor 28 with an intake port 29 to the outside and an exit port 30 through the bottom wall of the cover, a water tank 32 in communication with the port 29 through an adjustable valve 33, a control box 34 and a motor 36. Magnetic clutches 38 and 39 are arranged respectively to connect the motor with the compressors 20 and 28. A heating coil 40 is suitably carried by the cover beneath its bottom wall 16, and a port 41 with a relief valve 42 is provided through the cover to the chamber 15.

The controls within the box 34 and the electric circuit are illustrated in Fig. 2. The circuit to the motor, magnetic clutches and heater through the battery 44 and resistor 45 are automatically controlled by devices comprising three metal bellows 46, 47 and 48 supported on the bottom wall of the box and closed at their top ends. Each bellows carries two contacts 50 on its top end arranged to cooperate with two contacts 52 in the circuit and each is provided with a spring 53 and an adjusting screw 54.

The bellows 46 is adapted automatically to maintain predetermined pressure in the chamber 15. An open tube 56 extends downwardly therefrom into the chamber 15 whereby a predetermined low pressure in the chamber will permit the bellows to contract and connect its contacts 50 and 52, thereby starting the motor and closing the clutch 39 to the air compressor 28. Air together with moisture from the tank 32 are thereupon forced into the chamber 15 until the desired pressure is built up. The relief valve 42 is so set that a change of air is provided at predetermined periods.

The bellows 47 is adapted automatically to maintain a predetermined low temperature in the chamber 15. This bellows is filled with an expansible fluid, as methyl chloride, and a closed tube or bulb 57 extends downwardly therefrom into the chamber 15. When the temperature in the chamber 15 reaches a predetermined high the bellows is expanded to close its contacts 50—52, thereby starting the motor and closing the clutch 38 to the compressor 20. The compressor 20 thereupon functions until the predetermined low temperature is reached and the bellows 47 contracted to disconnect its switch contacts.

The bellows 48 is adapted automatically to maintain a predetermined high temperature in the chamber 15. This bellows is filled with an expansible fluid and a closed tube or bulb 58 extends downwardly therefrom into the chamber 15. When the temperature in the chamber 15 reaches a predetermined low, the bellows contracts to close its contacts 50—52, thereby closing the circuit to the heating coil 40. A suitable layer of insulation 59 is provided over the top face of the wall 16.

In Fig. 3 I have illustrated a modified construction in which the storage chamber 15' is kept at a predetermined low temperature by cold air instead of by direct employment of the refrigerant coil in the storage chamber. In this case the refrigerant coil 26' is placed within the chamber 60 in the cover 12' and air from the compressor 28' is passed through a port 61 to this chamber and from thence through a port 62 to the storage chamber 15'. This apparatus and its operation are otherwise like that shown in Figs. 1 and 2 and above described. Like parts corresponding to those shown in Figs. 1 and 2 are indicated by like reference characters primed.

In Fig. 4 I have illustrated a modified construction adapted to use dry ice as the refrigerant. In this case a closed chamber 64 is provided for Dry Ice 65 in the storage chamber 15''. A vent is provided at 66 and the ice will be wrapped in suitable insulation 68. Except for the elimination of the mechanical refrigerating features, this apparatus and its operation are like that shown in Figs. 1 and 2 and above described. Like parts corresponding to those shown in Figs. 1 and 2 are indicated by like reference characters double primed.

In Figs. 5–11ª I have illustrated a modified construction adapted to use Dry Ice (solid carbon dioxide) as the refrigerant and furthermore adapted to utilize the sublimation gas from this ice to drive a compressor furnishing predetermined air pressure and change of air to the storage chamber. This eliminates all the conditioning mechanism shown in Figs. 1 and 2 except the heating coil 40''' and its control at 34'''. Like parts corresponding to those in Figs. 1 and 2 are indicated by like reference characters triple primed.

In this case a closed Dry Ice chamber 70 is carried by the cover beneath its bottom wall 16'''. Mounted in alignment on this wall within the cover chamber are a motor 71 and a compressor 72. These two units are identical except that the piston 74 and cylinder chamber 75 in the motor are of relatively larger diameter. Sublimation gas from the Dry Ice is conducted from the chamber 70 through a port 77 to the motor. The compressor has an exhaust port 78 to the chamber 15'''. The pistons in the two cylinders are mounted on opposite ends of a rod 80 connected by a yoke 81 to a valve operating link 82.

The valve construction in the motor and compressor are identical, each embodying a rotary valve 83 having two right angular ports 84 and 85. Each port 85 is continued to the outside through a port 86 and a pipe 87. Ports 88 and 90 to opposite ends of each cylinder have connected ports 91 and 92 cooperating with the valve ports 84 and 85 as shown in Fig. 6. Each rotary valve 83 is slidable longitudinally into place in its engine head and is held in place by a threaded plug 93.

An arm 94 fixed on one end of each valve 83 is rotatably operative between two stops 95 and carries a pin 96 disposed within a slot 97 in the link 82. A spring pressed plunger 98 pivoted to an arm 99 fixed to the valve normally moves the arm 94 toward and holds it in position against one or the other stop. The arrangement is such that at each end of its stroke the link 82 and pins 96 move the arms past dead center and the plungers 98 complete the movement, whereby reversing the direction of movement of the piston rod 80.

It will be apparent that the ice within the chamber 70 refrigerates the storage chamber 15''' and that the sublimation gas drives the motor 71 which drives the air compressor 72 and provides air pressure and change of air within the storage chamber. The air pressure and change of air in the storage chamber are controlled by suitable adjustment of the relief valve 42'''. When the valves are in the position indicated in Figs. 6, 7, 7ª, 10 and 11 the pistons are moving to the right (Fig. 6) and air is being forced through the port 78 into the chamber 15''' from the right hand end of the compressor 72. When the valves are reversed to the position indicated in Figs. 10ª and 11ª the pistons are moving to the left and air is being forced through the port 78 into the chamber 15''' from the left hand end of the compressor 72. The port 86 and pipe 87 in one valve serves as an exhaust port for the motor 71 and this port and pipe in the other valve serves as an intake port to the compressor 72.

In Figs. 14, 15 and 16 I have illustrated a relatively simple and economical modified construction of my invention adapted solely to the employment of Dry Ice as the conditioning medium and including no mechanical moving parts. This container embodies a body portion 100 and a double walled cover 102. The container can be insulated in any desired manner, as illustrated in Figs. 1-3 or by insulation between the double walls as illustrated in Figs. 14-16. The body portion provides a storage chamber 104 and the cover is secured as by clamping bolts 105.

Centrally disposed within the cover chamber between its parallel and circular walls is a sheet metal aluminum Dry Ice box 106. The box is supported directly on the bottom wall 108 by means of an aluminum collar 109 in metal to metal contact with the box and the bottom wall of the cover. The box is open at one end and is anchored at the opposite two corners to the cover wall by sheets 110 of fibre or like heat insulation material. The open end of box is likewise anchored by sheets 112 and is provided with a removable closure including insulation 114 to permit the refilling of the box with ice 116. A refrigerating pipe 118 extends from the box 106 outwardly through the wall 108, is formed into a coil within the storage chamber 104 and vents outwardly through the cover at 120. An adjustable relief valve 122 is provided in the pipe between the coil and the venting exit. A temperature of —110° F. is normally maintained in the box 106 and the temperature to be maintained in the storage chamber depends on the product contained.

The box 106 is heavily insulated except for the metal contact through the supporting collar 109 and the sublimation of the ice will be in proportion to the heat acquired from the chamber 104 plus the heat passing through the insulation. I have discovered that an insulated storage chamber can be refrigerated and a predetermined temperature maintained by sublimating Dry Ice within a closed chamber and conducting the sublimation gas therefrom through a pipe in the storage chamber at a predetermined pressure controlled at the vent end of the pipe, and I have employed this principle in the apparatus herein described. The relief valve 122 is set to permit escape of gas at a pressure which has been predetermined to produce and maintain the temperature required in the storage chamber. It will be apparent that sublimation will be greater when relatively small pressure is required for escape of the gas and that the sublimating action will operate to lower the temperature in proportion to the sublimation. I have employed this apparatus in the storage of perishable products and have maintained a predetermined temperature of 45° F., uniformly within less than 2° over a period of 104 hours. The device is particularly adapted to the preserving and shipping of whole blood, blood plasma and like perishable products.

It may in some cases be desirable to keep the product under predetermined pressure in addition to the predetermined temperature and in Fig. 14 I have illustrated a modified construction adapted to serve this additional function. In this case a vent 124 is provided from the pipe coil forwardly of the valve 122' and a relief valve 126 is provided for controlling the venting of gas therefrom. The valve 126 is set to provide the predetermined pressure required in the storage chamber and the valve 122 is set to vent at such predetermined pressure as will produce the desired temperature. The parts corresponding to those shown in Figs. 12 and 13 are indicated by like reference characters primed.

It will now be apparent that I have produced and herein disclosed a novel portable shipping unit and a novel method of refrigerating and maintaining predetermined atmospheric conditions within a storage chamber, together with novel apparatus for carrying the invention into practice and shipping various products long distances under varying conditions and temperatures and without deterioration.

Having thus disclosed my invention, what I claim as new and desire to secure by Letters Patent of the United States is:

1. A shipping unit comprising a container having a storage chamber within insulated walls and an opening thereinto, a removable cover for the opening including insulation adapted to cooperate with said walls to enclose the chamber, means housed within the cover and chamber and including a refrigerant coil carried by the cover and located in the chamber for automatically maintaing a predetermined temperature in the chamber, and means for automatically maintaining predetermined pressure in the chamber.

2. A portable shipping unit comprising a container with a removable cover and including insulation surrounding a storage chamber, a Dry Ice box insulated within the cover, a refrigerant pipe carried by the cover and having one end extending into the box, the other end extending outwardly of the unit through the cover and an intermediate portion of substantial length located in position to project into and along one wall of the storage chamber when the cover is in working position on the container, and means for controlling the gas pressure maintained within the pipe.

3. The unit defined in claim 2 plus means providing a heat conductive medium of predetermined capacity between the storage chamber and Dry Ice box.

4. A refrigerant container embodying insulated walls providing a sealed storage chamber of substantial capacity therein and an adjacent refrigerating chamber for dry ice associated therewith, a motor-compressor unit embodying two axially aligned cylinders and two connected pistons therein, piping from the Dry Ice chamber to the motor cylinder, piping from the compressor cylinder to the storage chamber, and a relief valve for venting the storage chamber at predetermined pressure.

5. A shipping unit comprising a box-like container having a storage chamber within insulated walls and open only at the top end of the chamber, a removable cover closing said end of the chamber, a closed Dry Ice box within insulation in the cover, a refrigerating pipe carried solely by the cover and extending for a substantial length in and adjacent to one wall of the chamber and from thence through the cover to the atmosphere, and a valve in the pipe adjacent to its outer end for maintaining a uniform gas pressure in the box and pipe to the valve.

6. A portable unit for shipping perishable products, comprising a box-like container having a storage chamber within insulated walls and open only at one end of the chamber, a removable cover closing said end of the chamber, refrigerating means carried solely by the cover and including a refrigerating coil associated with and adapted to refrigerate the chamber and means for generating and forcing a refrigerant through the coil, and means in the chamber for automatically controlling the first named means and maintaining a predetermined temperature in the chamber, the chamber being fully open at said end for filling with or removing said products when the cover is removed.

7. A portable unit for shipping perishable products, comprising a box-like container having a storage chamber within insulated walls and open only at one end of the chamber, a removable cover closing said end of the chamber, refrigerating means carried solely by the cover and including a refrigerating coil in and disposed along one wall of the chamber and means for generating and forcing a refrigerant through the coil, and means in the chamber for automatically controlling the first named means and maintaining a predetermined temperature in the chamber, the locating of the coil along said wall of the chamber being adapted to leave substantially the entire chamber free to receive said products.

GEORGE B. WAGNER.

REFERENCES CITED

The following references are of record in the file of this patent:

UNITED STATES PATENTS

| Number | Name | Date |
|---|---|---|
| 927,223 | Chidester | July 6, 1909 |
| 1,145,054 | Boekel et al. | July 6, 1915 |
| 1,848,440 | Spitzenberger | Mar. 8, 1932 |
| 1,864,040 | Campbell | June 21, 1932 |
| 1,878,042 | Wagner | Sept. 20, 1932 |
| 1,878,503 | Martin | Sept. 20, 1932 |
| 1,963,674 | Pearsons | June 19, 1934 |
| 2,012,190 | Green | Aug. 20, 1935 |
| 2,018,608 | Du Bois | Oct. 22, 1935 |
| 2,026,353 | Mayer | Dec. 31, 1935 |
| 2,034,139 | Grayson | Mar. 17, 1936 |
| 2,082,381 | Chamberlain | June 1, 1937 |
| 2,104,024 | Conboie | Jan. 4, 1938 |
| 2,188,526 | Burden | Jan. 30, 1940 |
| 2,191,518 | Clerc | Feb. 27, 1940 |
| 2,285,946 | Kalischer | June 9, 1942 |
| 2,345,204 | Lodwig | Mar. 28, 1944 |